United States Patent [19]
Kondo et al.

[11] Patent Number: 5,666,955
[45] Date of Patent: Sep. 16, 1997

[54] ULTRASONIC DIAGNOSTIC APPARATUS HAVING FRAME RATE HIGHER THAN TV FRAME RATE

[75] Inventors: Shinichi Kondo, Kashiwa; Akira Sasaki, Ichikawa; Hiroshi Kanda, Tokorozawa; Tsuyoshi Mitake, Noda; Kazutaka Okada, Iwatsuki, all of Japan

[73] Assignee: Hitachi Medical Corporation, Tokyo, Japan

[21] Appl. No.: 422,222

[22] Filed: Apr. 14, 1995

[30] Foreign Application Priority Data

Apr. 22, 1994 [JP] Japan .................................. 6-084397

[51] Int. Cl.$^6$ ........................................................ A61B 8/00
[52] U.S. Cl. .................................................. 128/660.04
[58] Field of Search .......................... 128/660.04, 660.07, 128/661.1

[56] References Cited

U.S. PATENT DOCUMENTS

| | | | |
|---|---|---|---|
| 4,572,202 | 2/1986 | Thomenius ......................... | 128/660.07 |
| 5,016,642 | 5/1991 | Dukes et al. ....................... | 128/660.07 |
| 5,318,033 | 6/1994 | Savord .............................. | 128/661.01 |
| 5,325,859 | 7/1994 | Ishihara et al. ..................... | 128/660.07 |

*Primary Examiner*—Francis Jaworski
*Attorney, Agent, or Firm*—Antonelli, Terry, Stout & Kraus, LLP.

[57] ABSTRACT

An ultrasonic diagnostic apparatus for displaying a subject moving at high speed, in slow motion. The apparatus has a circuit for picking up an ultrasonic image signal at a frame rate higher than a display frame rate, a circuit for writing the picked-up image signal at a frame rate higher than the display frame rate, a circuit for reading the image signal from the memory at the display frame rate, and a device for displaying the read image signal.

2 Claims, 6 Drawing Sheets

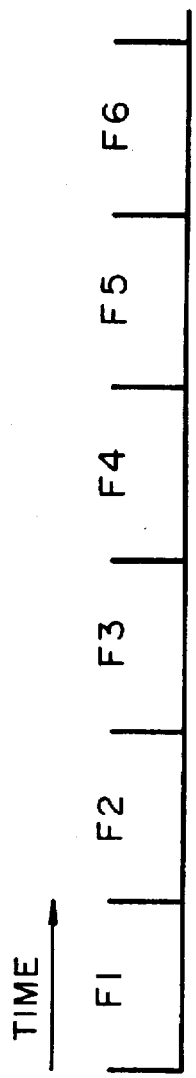
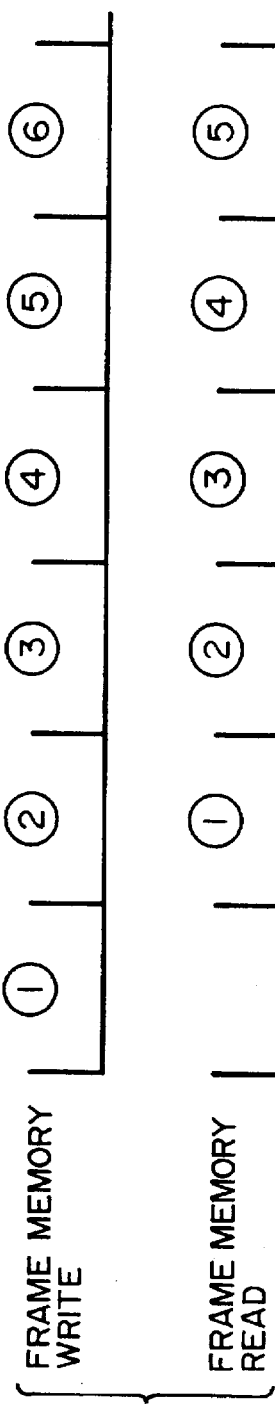
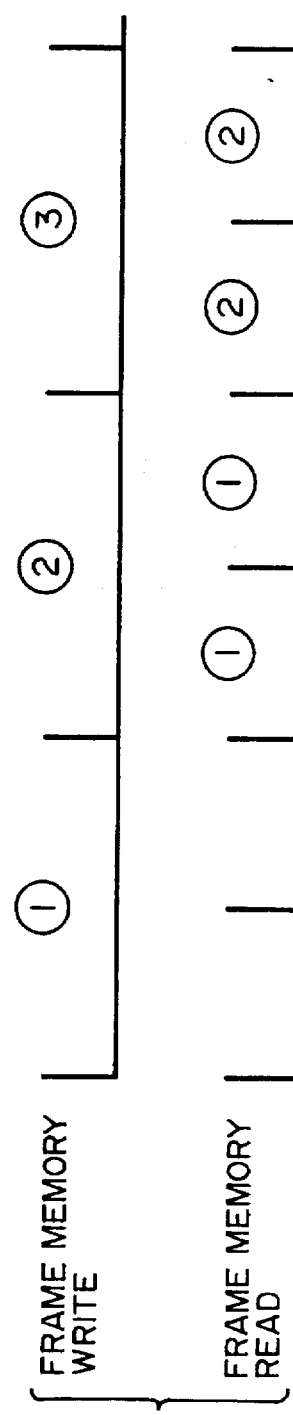
FIG. 2A PRIOR ART
FIG. 2B PRIOR ART
FIG. 2C PRIOR ART

ULTRASONIC DIAGNOSTIC APPARATUS HAVING FRAME RATE HIGHER THAN TV FRAME RATE

BACKGROUND OF THE INVENTION

1. Field of the Invention

The present invention relates to an ultrasonic diagnostic apparatus, and more particularly to a frame rate of recording and displaying an ultrasonic echogram.

2. Description of the Related Art

In operation of a conventional ultrasonic diagnostic apparatus such as shown in FIG. 1, an ultrasonic beam is transmitted from and received by a probe 1. The signal received by a transceiver 2 is processed by a received beam phase adjuster 3' and a detector/compressor 4' and written in a frame memory 6 and in a continuous image memory 7. The frame memory 6 stores the received image signal in the unit of frame, and the continuous image memory 7 continuously stores the received image signal indifferent to each frame. A signal read from the frame memory 6 or continuous image memory 7 is selected by a selector 8 and displayed on a display device 8. A data write operation for the memories 6 and 7 is performed in accordance with an address supplied from a memory write address circuit 14, whereas a data read operation for the memories is performed in accordance with an address supplied from a memory read address circuit 15. Operation timings for the whole circuit of the apparatus is controlled by a main clock generated by an oscillator 12. The main clock is supplied to a TV frame synchronizing signal generator 16 which in turn generates a TV frame synchronizing signal. By using this TV frame synchronizing signal, the operation timings of the transceiver 11, address circuits 14 and 15, and display device 10 are controlled.

In such a conventional apparatus, the control of transmitting/receiving ultrasonic beams and writing/reading image data to and from the memories 6 and 7 has been performed by using the TV frame synchronizing signal generated by the TV frame synchronizing signal generator 16 which is supplied with the main clock from the oscillator 12.

Specifically, an image signal has been picked up conventionally at a frame rate lower than the TV frame rate (30 frames/sec), for example, at 15 or 5 frames/sec, and displayed at 30 frames/sec.

Also in a conventional apparatus of a plural beam reception type, an image signal is picked up at a frame rate lower than the TV frame rate, and displayed at the TV frame rate.

An example of conventional image display will be described with reference to FIGS. 2A to 2C.

FIG. 2A is a timing chart of a TV frame synchronizing signal. The time period between two consecutive pulses corresponds to one frame (Fi). FIG. 2B is a timing chart explaining the operation of a frame memory wherein the image pickup frame rate is set to be equal to the TV frame rate. For example, the frame memory has two buffers each having a capacity of one frame. Data is written and read alternately between the two buffers. Specifically, while data is written in one of the two buffers, image data of one frame is read from the other buffer and displayed on the display device. FIG. 2C is a timing chart explaining the operation of a frame memory wherein the image pickup frame rate is set to a half of the TV frame rate. In this case, image data of one buffer is displayed twice synchronously with the TV frame synchronizing signal.

Conventional apparatuses are not intended to pick up an image at a frame rate higher than the TV frame rate and display it in slow motion.

SUMMARY OF THE INVENTION

An ultrasonic diagnostic apparatus of this invention has a circuit for generating an ultrasonic image frame synchronizing signal at a frame rate higher than the frame rate of a display device. The apparatus is of the type that it receives a plurality of ultrasonic beams per one transmitted ultrasonic beam. The ultrasonic image frame synchronizing signal controls transmission/reception of ultrasonic beams and data write into a frame memory and a continuous image memory. In this manner, an image signal is written in the memory at a speed higher than the frame rate of the display device.

A data read operation for the memory is performed synchronously with the frame rate of the display device.

With the structure of this invention described above, it becomes possible to pick up an image signal at a frame rate higher than the TV frame rate and display it in slow motion. Therefore, a subject moving at a high speed such as the valves of a heart and blood flows can be monitored precisely, improving the performance of diagnosis.

BRIEF DESCRIPTION OF THE DRAWINGS

FIGS. 2A to 2C are timing charts showing the relationship between image pickup rates and display rates of a conventional ultrasonic diagnostic apparatus.

DETAILED DESCRIPTION OF THE PREFERRED EMBODIMENTS

Figure 1:
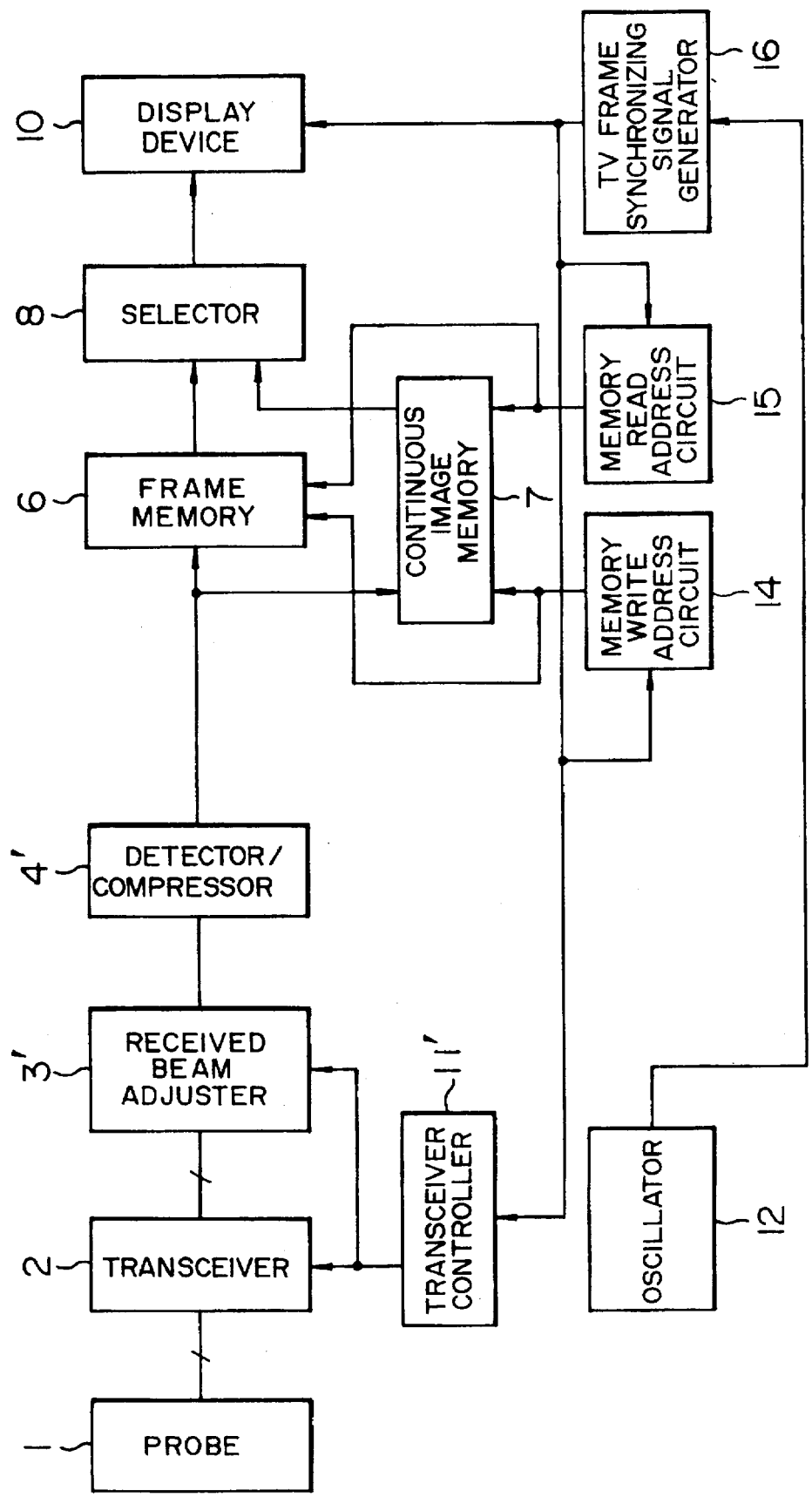
FIG. 1 is a circuit block diagram of a conventional ultrasonic diagnostic apparatus.
Figure 3:
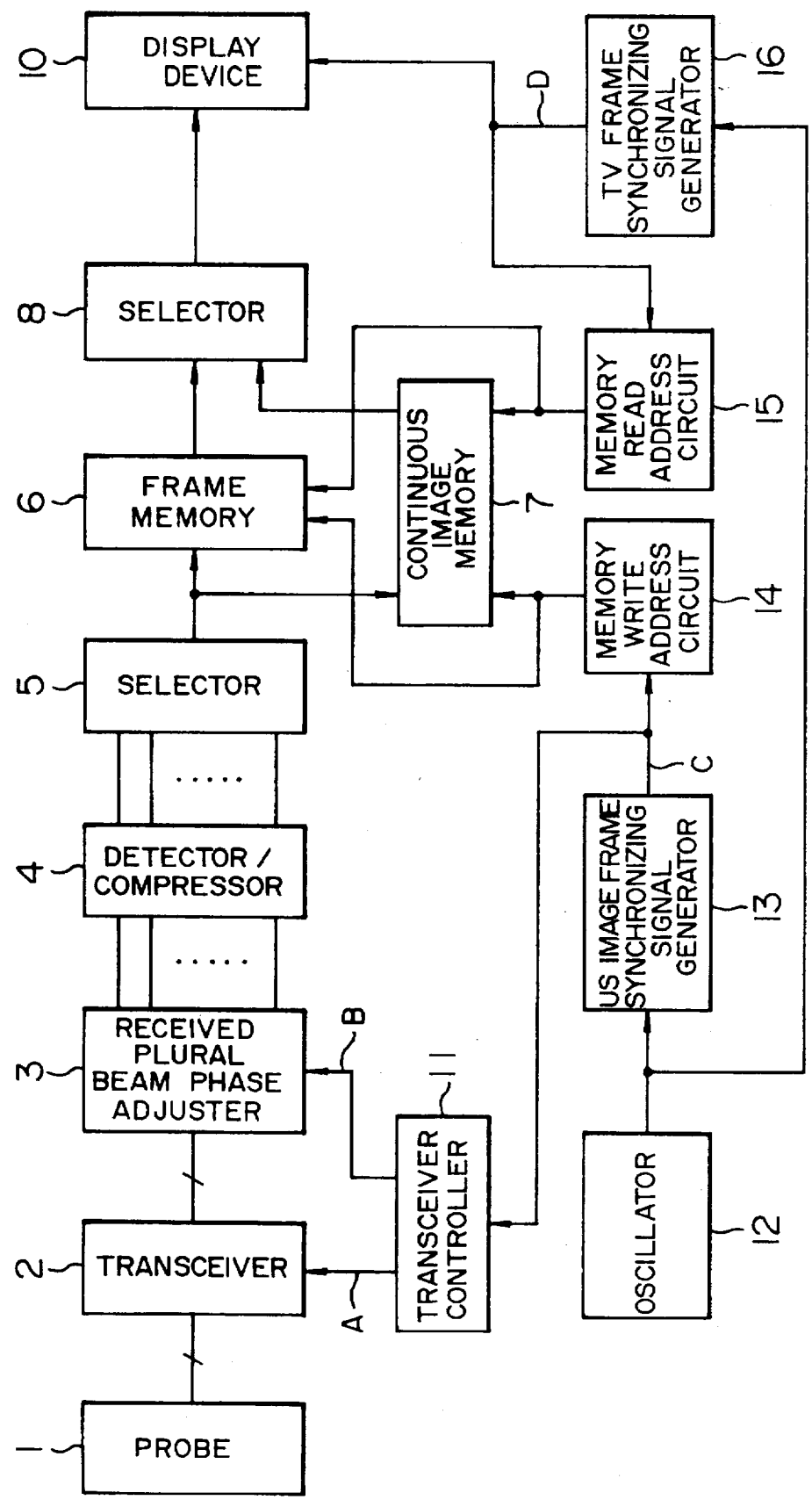
FIG. 3 is a circuit block diagram of an ultrasonic diagnostic apparatus in accordance with the present invention.

FIG. 3 is a block diagram showing the structure of an ultrasonic diagnostic apparatus of this invention. Like elements to those shown in FIG. 1 are represented by identical reference numerals.

Referring to FIG. 3, as a probe 1 transmits an ultrasonic beam, it receives a plurality of reflected ultrasonic beams in different directions. The received ultrasonic beams are supplied to a transceiver 2 and to a received plural beam phase adjuster 3 both of which are controlled by synchronizing signals from a transceiver controller 11. The received plural beam phase adjuster 3 may be a digital phase adjuster described in JP-A-59-49752 or "the 63th proceedings of the Japan Society of Ultrasonics in Medicine (JSUM)", pp. 643–644, November 1993. The output signals of the received plural beam phase adjuster 3 are supplied to detectors/compressors 4 whereat the signals are detected and compressed. The signals are then converted from parallel signals into a serial signal by a first selector 5, or directly written as parallel signals in a frame memory 6 and a continuous image memory 7 at corresponding beam addresses. The frame memory 6 is constituted by two buffers capable of being alternately written and read each having a capacity of, for example, three frames. The continuous image memory 7 is a memory for continuously storing image signals for a long time period. Write addresses for the memories 6 and 7 are generated by a memory write address circuit 14 in accordance with a synchronizing signal C supplied from an ultrasonic (US) image frame synchronizing signal generator 13 which is supplied with a main clock from an oscillator 12. The US image frame synchronizing signal generator 13 operates independently from a TV frame synchronizing generator 16.

The synchronizing signal C from the US image frame synchronizing signal generator 13 is also supplied to the transceiver controller 11 for the control of ultrasonic beam transmission/reception.

Figure 4:
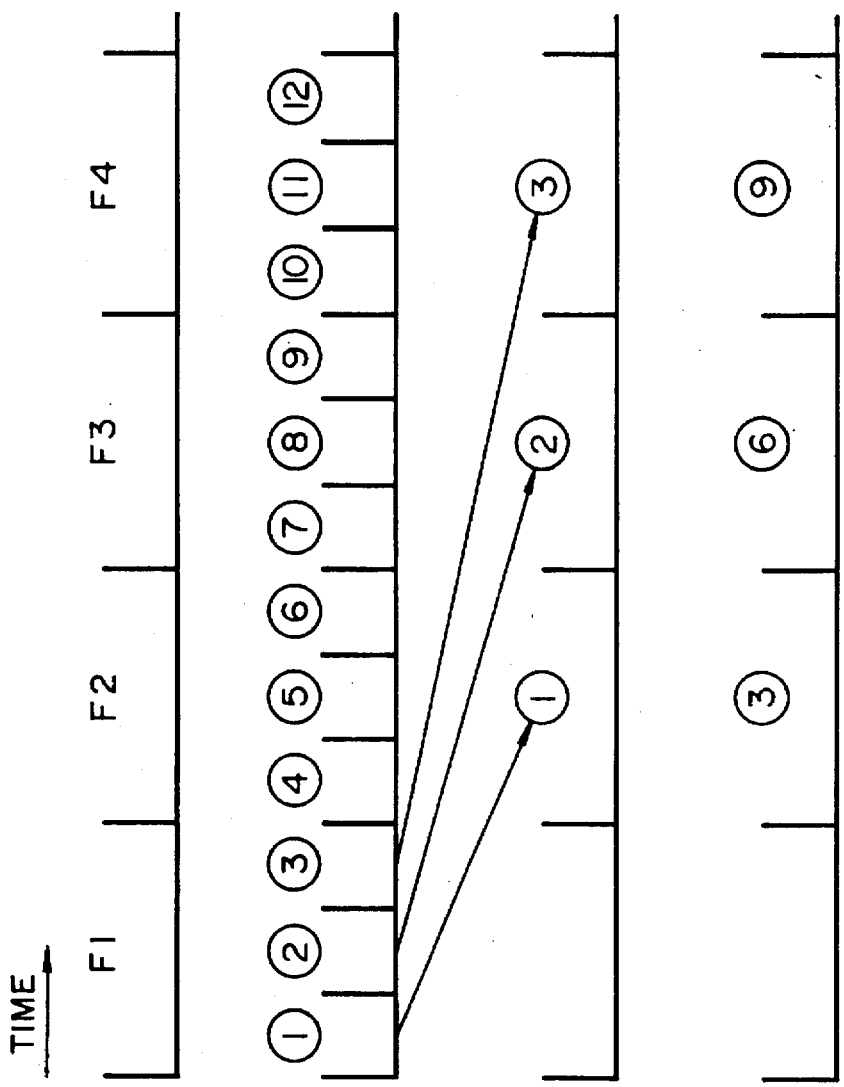
FIGS. 4A to 4D are timing charts showing the relationship between image pickup rates and display rates of an ultrasonic diagnostic apparatus of this invention.

Read addresses for the frame memory 6 and continuous image memory 7 are generated by a memory address circuit 15 in accordance with a synchronizing signal D from the TV frame synchronizing signal generator 16. An example of the relationship between the TV frame synchronizing signal D and US image frame synchronizing signal C is shown in FIGS. 4A and 4B. The number of TV frames is generally 30 or 60 frames/sec. The number of US image frames is multiplied by the number of plural ultrasonic beams reflected when a single beam is transmitted, because the received plural beam phase adjuster 3 and US image frame synchronizing signal generator 13 are used. Therefore, the number of US image frames can be set to be in excess of the number of TV frames. In the example shown in FIG. 4B, the number of US image frames is a three-fold of that of TV frames. Specifically, in each TV frame F1, F2, . . . , three US image frames (1, 2, 3), (4, 5, 6), . . . are generated. Therefore, US image frame signals are written in the frame memory 6 (or continuous image memory 7) at a speed three times as high as that when TV frame signals are read. Reading data from the memories 6 and 7 is required to be synchronous with the TV frame. Therefore, as shown in FIG. 4C, the period of the TV frame synchronizing signal is prolonged by three times as small as that of the US image frame synchronizing signal, to thereby reproduce and display the US image frame signals in slow motion. US image frame signals stored in the frame memory 6 may be thinned and displayed as indicated at (3, 6, 9, . . . ) in FIG. 4D. A second selector 8 selects data either from the frame memory 6 or the continuous image memory 7.

The read/write operation of the memories 6 and 7 will be described.

(1) Write:

The same data is written in the memories 6 and 7 in parallel at the same time.

(2) Read:

The data written in the memory 6 at a high speed is reproduced in slow motion or in a thinned state. The data written in the memory 7 is reproduced in slow motion matching TV frames. The speed of reproducing image data in the memory 7 in slow motion may be set to be variable. In reproducing image data, the selector 8 operates to serially read image data either from the memory 6 or from the memory 7. If two images (thinned image for the memory 6 and image in slow motion for the memory 7) are to be displayed at the same time, the selector 8 selects the memories 6 and 7 alternately.

Figure 5:
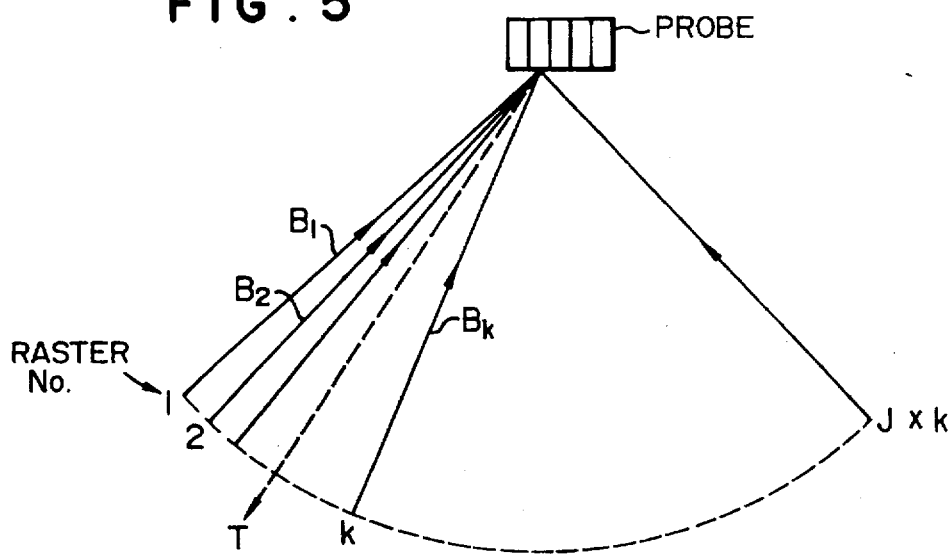
FIG. 5 is a diagram explaining the principle of plural beam reception.

FIG. 5 is a diagram explaining the principle of plural beam reception per single beam transmission. When a single beam T is transmitted, k reflected beams ($B_1, \ldots, B_k$) are received. A sector scan is illustrated by way of example.

Figure 6:
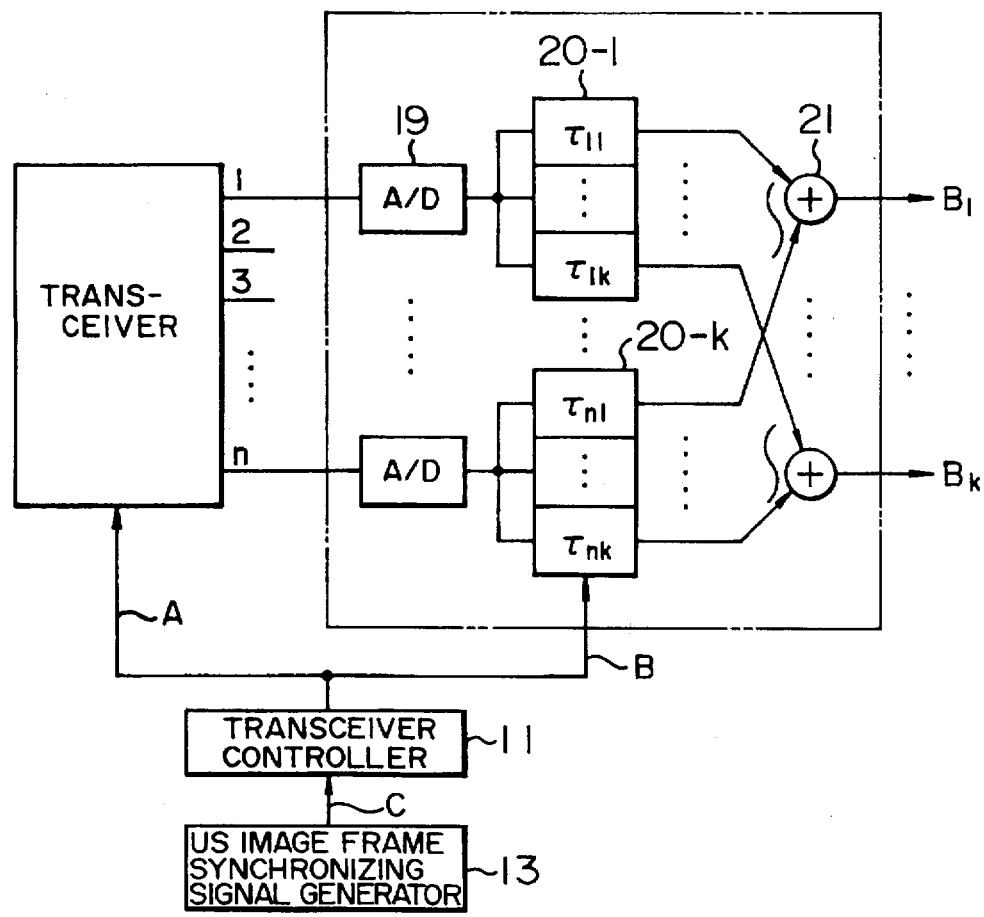
FIG. 6 is a circuit block diagram of a plural beam phase adjuster according to an embodiment of the invention.

FIG. 6 shows an embodiment of the received plural beam phase adjuster 3.

In this embodiment, the received plural beam phase adjuster 3 is constituted by A/D converters 19, multiple output digital delay circuits 20-1 to 20-$k_1$, and adders 21. Each multiple output digital delay circuit is a combination of shift registers and selectors, or a combination of RAMs and FIFO (first-in first-out) registers. In FIG. 6, $\tau_{11}$ to $\tau_{1k}$ represent delay times in different beam directions $B_1$ to $B_k$ of the outputs of the phase adjuster, and $B_1$ to $B_k$ represent addition outputs of each phase adjusted plural beam.

Figure 7:
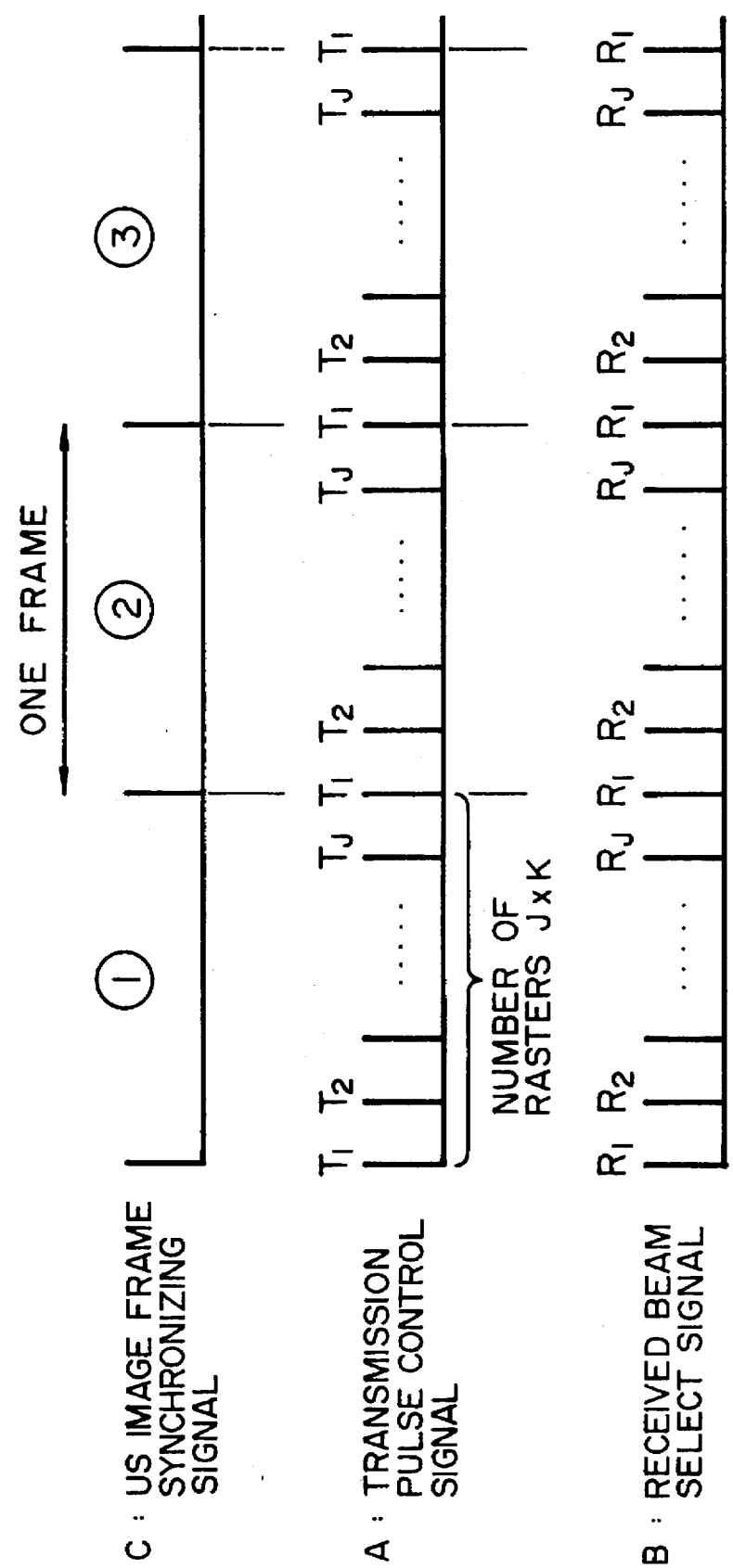
FIG. 7 shows timing charts explaining the operation of a transceiver controller of the ultrasonic diagnostic apparatus of the invention.

FIG. 7 shows timing charts explaining the operation of the transceiver controller 11.

During one period, for example, 10 ms, of the US image frame synchronizing signal C, transmission pulse control signals A ($T_1, \ldots, T_j$) corresponding in number to the number of rasters J×k are generated and supplied to the transceiver 2, where k is the number of beams received at the same time.

At the same time, received beam select signals B ($R_1, \ldots, R_j$) are generated and supplied to the received plural beam phase adjuster 3 to adjust the phases of received beams.

The capacity of the frame memory is not limited to that of the embodiment, but a larger capacity may be used.

Preferred Embodiments are not limited to the above mentioned. Various embodiments are included in the present invention in accordance with the spirit and scope of our invention.

What is claimed is:

1. An ultrasonic diagnostic apparatus comprising:

an ultrasonic beam transmission/reception circuit for transmitting a single ultrasonic beam and receiving a plurality of ultrasonic beams;

a phase adjusting circuit for adjusting the phases of said plurality of ultrasonic beams;

storage means for sequentially storing a plurality of phase adjusted beam outputs from said phase adjusting circuit;

means for reading an image signal from said storage means at a display frame rate of display means;

said display means for displaying said read image signal;

means for generating an ultrasonic image synchronizing frame rate signal at a frame rate higher than the display frame rate of said display means;

means for controlling said ultrasonic beam transmission/reception circuit and said phase adjusting circuit in accordance with said ultrasonic image synchronizing frame rate signal; and means for controlling the image signal write operation for said storage means in accordance with said ultrasonic image synchronizing frame rate signal.

2. An ultrasonic diagnostic apparatus according to claim 1, further comprising:

means for generating a display frame rate signal of said display means; and means for supplying a signal to said ultrasonic image frame rate signal generating means and to said display frame rate signal generating means so as to effect synchronization thereof.

* * * * *